United States Patent
Chang et al.

(10) Patent No.: US 10,095,195 B2
(45) Date of Patent: Oct. 9, 2018

(54) DEVICE AND METHOD FOR SCHEDULING POWER STORAGE DEVICES

(71) Applicant: KOREA ELECTRIC POWER CORPORATION, Seoul (KR)

(72) Inventors: Byung-Hoon Chang, Daejeon (KR); Yong-Gu Ha, Daejeon (KR); Kwang-Hee Hong, Yongin-Si (KR); Woong-Jae Jeon, Seoul (KR); Kyu-Won Jeong, Suwon-Si (KR)

(73) Assignee: Korea Electric Power Corporation, Seoul (KR)

( * ) Notice: Subject to any disclaimer, the term of this patent is extended or adjusted under 35 U.S.C. 154(b) by 789 days.

(21) Appl. No.: 14/380,675

(22) PCT Filed: Feb. 22, 2013

(86) PCT No.: PCT/KR2013/001457
§ 371 (c)(1),
(2) Date: Aug. 22, 2014

(87) PCT Pub. No.: WO2013/125909
PCT Pub. Date: Aug. 29, 2013

(65) Prior Publication Data
US 2015/0032276 A1 Jan. 29, 2015

(30) Foreign Application Priority Data

Feb. 23, 2012 (KR) .................. 10-2012-0018563
Mar. 16, 2012 (KR) .................. 10-2012-0027231

(51) Int. Cl.
*H02J 7/34* (2006.01)
*G05B 13/02* (2006.01)
(Continued)

(52) U.S. Cl.
CPC ............ *G05B 13/026* (2013.01); *G05F 1/66* (2013.01); *H02J 7/34* (2013.01); *H02J 3/32* (2013.01)

(58) Field of Classification Search
CPC .. G05B 13/026; G05F 1/66; H02J 7/34; H02J 3/32
See application file for complete search history.

(56) References Cited

U.S. PATENT DOCUMENTS

2003/0069648 A1* 4/2003 Douglas ............... G06Q 10/20
700/2
2008/0281663 A1* 11/2008 Hakim ............... B60L 11/1824
705/7.25
(Continued)

FOREIGN PATENT DOCUMENTS

JP 2001-511637 A 8/2001
JP 2007-535282 A 11/2007
(Continued)

OTHER PUBLICATIONS

International Search Report issued in International Application No. PCT/KR2013/001457 dated Jun. 27, 2013, with English Translation.

*Primary Examiner* — Isaac T Tecklu
(74) *Attorney, Agent, or Firm* — McDermott Will & Emery LLP

(57) ABSTRACT

Provided are a device and a method for scheduling power storage devices, wherein a plurality of power storage device can be efficiently managed in an integrated manner by distributing appropriate charging and discharging schedules to each power storage device. The provided device for scheduling power storage devices comprises: an input unit for receiving integrated schedule information, characteristic information, and state information of the power storage devices; a scheduling unit for generating schedule informa-
(Continued)

tion of the power storage devices on the basis of the received integrated schedule information, characteristic information, and state information; and an output unit for outputting the generated schedule information to the power storage devices.

18 Claims, 12 Drawing Sheets

(51) Int. Cl.
  *G05F 1/66* (2006.01)
  *H02J 3/32* (2006.01)

(56) References Cited

U.S. PATENT DOCUMENTS

| | | | | |
|---|---|---|---|---|
| 2011/0066258 A1* | 3/2011 | Torzhkov | ............ | G05B 13/042 700/29 |
| 2012/0053751 A1 | 3/2012 | Borresen et al. | | |
| 2014/0172183 A1* | 6/2014 | Beeman | .................. | H02J 3/32 700/291 |
| 2015/0115710 A1* | 4/2015 | Tuerk | ...................... | H02J 7/042 307/23 |
| 2015/0171641 A1* | 6/2015 | Sato | ...................... | H02J 7/0013 320/107 |
| 2016/0118795 A1* | 4/2016 | Berkowitz | ............ | H02J 3/1807 700/286 |
| 2016/0347302 A1* | 12/2016 | Niwa | .................... | B60W 20/00 |
| 2016/0363948 A1* | 12/2016 | Steven | ...................... | G05F 1/66 |

FOREIGN PATENT DOCUMENTS

| | | | | |
|---|---|---|---|---|
| JP | 2010-041883 A | 2/2010 | | |
| JP | 2011-125171 A | 6/2011 | | |
| KR | 10-2011-0078965 A | 7/2011 | | |
| KR | 10-1071295 B1 | 9/2011 | | |
| KR | 10-2011-0127033 A | 11/2011 | | |
| KR | 10-2011-0136803 A | 12/2011 | | |
| KR | 20110136803 A * | 12/2011 | ............ | G05B 13/04 |
| WO | 99/05766 A1 | 2/1999 | | |
| WO | 2005/008808 A2 | 1/2005 | | |
| WO | WO 2010089253 A1 * | 8/2010 | ............ | G05B 13/04 |

* cited by examiner

DEVICE AND METHOD FOR SCHEDULING POWER STORAGE DEVICES

RELATED APPLICATIONS

This is the national phase of International Application No. PCT/KR2013/001457, with an international filing date of Feb. 22, 2013, which claims priority of Korean Patent Application No. 10-2012-0018563, filed on Feb. 23, 2012 and Korean Patent Application No. 10-2012-0027231, filed on Mar. 16, 2012, the contents of each of which are hereby incorporated by reference.

TECHNICAL FIELD

The present invention relates to an apparatus and method for scheduling energy storage systems (ESSs) and, more particularly, to an apparatus and method for scheduling ESSs, which are capable of efficiently managing a plurality of ESSs in an integrated manner by distributing an appropriate charging and discharge schedule depending on the characteristics and state of each ESS.

BACKGROUND ART

An electric power system refers to a single system in which a power plant, a substation, and loads are connected to consumers (i.e., the subjects of power consumption) through a power line and the generation and consumption of power are performed.

In an electric power system, demand for power should be continuously monitored because demand and supply need to be balanced because of the homogeneity of the generation and consumption of power.

Monitoring was easily performed in initial small-size electric power systems. However, as demand for power has increased due to the advancement and informationization of the industry, power equipment has also become bulky and complicated, thereby making it difficult to effectively manage the electric power system using a conventional electric power system monitoring method.

Accordingly, the integrated equipment automation for the efficient performance of the management of an electric power system using a function of collecting, processing, analyzing, and controlling information using computers and a communication function is rapidly advancing.

Meanwhile, with regard to an ESS, research has been conducted into the high capacity and longer life span of lithium ion batteries chiefly in the field of transportation energy, such as a hybrid electric vehicle (HEV) and an electric vehicle IEV), and the commercialization of large-sized lithium ion batteries has started.

A market in which the spread of large-sized lithium ion batteries are used has incalculable expansion potentiality, covering the automobile field, the agricultural industry, the construction machine field, the industry machine field, the transportation field, such as the fields of bicycles and streetcars, and the natural energy field.

With regard to a high-power storage field, large-sized power batteries, such as NAS batteries and Redox flow batteries, are in their early stage of commercialization, and thus competition with self-generation equipment and a new market for high-quality systems are expected.

These batteries have poor performance compared to lithium ion cells, but are in the stage in which the batteries are used for high-power storage because they have excellent price competitiveness compared to their capacities.

As new regeneration energy increases, an ESS is applied to the distribution, transmission and transformation of electric power. In the future, it is expected that high-capacity (MW-level) ESSs will be spread and provided for each substation. In addition, as smart grids are globally extended and applied, it is expected that the capability to generate new regeneration energy will be increased. Furthermore, ESSs will be extended and supplied to all electric power systems. Accordingly, there is a need for the development of a technology regarding a system capable of managing a plurality of ESSs in an integrated manner.

Therefore, if a scheduling apparatus and method capable of managing, in an integrated manner, numerous high-capacity ESSs that have been extended and supplied are provided, there will be an advantage in the control of the load leveling and the management of the power facility of an electric power system.

Active research is being carried out into a high-capacity ESS. It is expected that ESSs will be extended and supplied to all electric power systems with an increase in the capability to generate new regeneration energy in line with a global trend toward a smart grid.

For this purpose, Korean Patent Application Publication No. 10-2011-0078965 discloses a technology for selecting an operation mode in which the charging and discharging states of a power storage unit will be controlled with a wind power generator and the power storage unit configured to operate in conjunction with each other, calculating the amount of wind power generated by the wind power generator and the amount of possible power generated for each load and time span, and controlling the charging and discharging of the power storage unit using the calculated amount of possible power for each load and time span and power sale price conditions.

Japanese Patent Application Publication No. 2011-125171 discloses a technology configured to include a natural energy generation system, ESSs, and a controller, and configured to measure the amount of power received by a power plant through an electric power system, to compare the measured amount of power received with a specific value, and to switch the ESSs to a discharging state if the amount of power received is equal to or larger than a specific value.

However, conventional technologies that control ESSs are problematic in that they cannot perform the peak shaving or load leveling of an electric power system because they consider only the control of the charging and discharging of the ESSs with the amount of power generation taken into account.

DISCLOSURE

Technical Problem

Accordingly, the present invention has been made keeping in mind the above problems of the conventional methods, and an object of the present invention is to provide an apparatus and method for scheduling ESSs, which distribute an appropriate charging and discharge schedule to each ESS so that a plurality of the ESSs can be efficiently managed in an integrated manner. An object of the present invention is to provide an apparatus and method for scheduling ESSs, which schedule ESSs based on new regeneration energy generation prediction data and load prediction data so that the peak shaving and load leveling of an electric power system can be achieved.

Technical Solution

In order to accomplish the above object, the present invention provides an apparatus for scheduling energy storage systems (ESSs), include an input unit configured to receive integrated schedule information, characteristic information and state information of the ESSs; a scheduling unit configured to generate schedule information of the ESSs based on the received integrated schedule information, characteristic information and state information; and an output unit configured to output the generated schedule information to the ESSs.

The input unit receives the characteristic information, including information about a cycle of each ESS, and the state information, including at least one of a state of charge (SOC) of each ESS, a depth of discharge (DOD), an amount of battery power based on an economical DOD, and a possible output time, at intervals of a set cycle.

The input unit further receives load prediction data and new regeneration energy generation prediction data.

The scheduling unit calculates a scheduled discharging region in a highest region $P_{load,Max}$ of a curve data generated using a difference between the load prediction data and the new regeneration energy generation prediction data, and generates a scheduled discharging value $\Sigma(P_{Dk}, T_{Dk})$, including an amount of power to be discharged and a discharging time in the scheduled discharging region, as discharge schedule information.

The scheduling unit stops a $P_D$ scan at a point at which a sum of values obtained by multiplying an amount of power to be discharged and a discharging time in an identical section becomes equal to a value obtained by subtracting an amount of battery power $W_{ED}$ based on an economical DOD from an SOC $W_{SOC}$ of each ESS, and calculates the scheduled discharging region.

The scheduling unit calculates the amount of power $P_{Dk}$ to be discharged and the discharging time $T_{Dk}$ based on a value obtained by subtracting an amount of power $P_{D\_SCAN}$ in the scheduled discharging region from the difference $P_{load}$ between the load prediction data and the new regeneration energy generation prediction data in an identical time region.

The scheduling unit calculates a scheduled charging region in a lowest region $P_{load,Min}$ of a curve data generated using the difference between the load prediction data and the new regeneration energy generation prediction data, and generates a scheduled charging value $\Sigma(P_{Ck}, T_{Ck})$, including an amount of power to be charged and a charging time in the scheduled charging region, as charging schedule information.

The scheduling unit stops the $P_C$ scan at a point at which a sum of values obtained by multiplying an amount of power to be charged and a charging time in an identical section becomes equal to a DOD capacity $W_{DOD}$ of the ESS, and calculates the scheduled charging region.

The scheduling unit calculates the amount of power $P_{Ck}$ to be charged and the charging time $T_{Ck}$ based on a value obtained by subtracting the difference $P_{load}$ between the load prediction data and the new regeneration energy generation prediction data in an identical time region from an amount of power $P_{C\_SCAN}$ in the scheduled charging region.

The scheduling unit calculates target scheduling regions based on the integrated schedule information, and calculates matrix schedule information by arranging the ESSs based on time intervals in the target scheduling regions.

The scheduling unit arranges the ESSs based on the characteristic information and the state information.

The scheduling unit calculates the matrix schedule information by multiplying matrix ESS information, which forms the target scheduling regions, and matrix time information based on the time intervals.

The scheduling unit generates the schedule information, including at least one of charging schedule information and discharge schedule information.

In order to accomplish the above object, the present invention provides a method of scheduling energy storage systems (ESSs), including receiving, by an input unit, integrated schedule information, characteristic information, and state information of the ESSs; generating, by a scheduling unit, schedule information of the ESSs based on the received integrated schedule information, characteristic information and state information; and outputting, by an output unit, the generated schedule information to the ESSs.

Receiving integrated schedule information, characteristic information and state information comprises receiving, by the input unit, the characteristic information, including information about a cycle of each ESS, and the state information, including at least one of a state of charge (SOC) of each ESS, a depth of discharge (DOD), an amount of battery power based on an economical DOD, and a possible output time, at intervals of a set cycle.

Receiving integrated schedule information, characteristic information and state information comprises further receiving, by the input unit, load prediction data and new regeneration energy generation prediction data.

Generating schedule information may include generating, by the scheduling unit, a curve data using the difference between the load prediction data and the new regeneration energy generation prediction data; calculating, by the scheduling unit, a scheduled discharging region in a highest region $P_{load,Max}$; and generating, by the scheduling unit, a scheduled discharging value $\Sigma(P_{Dk}, T_{Dk})$, including an amount of power to be discharged and a discharging time in the scheduled discharging region, as discharge schedule information.

Calculating a scheduled discharging region includes stopping, by the scheduling unit, a $P_D$ scan at a point at which a sum of values obtained by multiplying an amount of power to be discharged and a discharging time in an identical section becomes equal to a value obtained by subtracting an amount of battery power $W_{ED}$ based on an economical DOD from an SOC $W_{SOC}$ of each ESS; and calculating the scheduled discharging region.

Calculating a scheduled discharging region comprises calculating, by the scheduling unit, the amount of power $P_{Dk}$ to be discharged and the discharging time $T_{Dk}$ based on a value obtained by subtracting an amount of power $P_{D\_SCAN}$ in the scheduled discharging region from the difference $P_{load}$ between the load prediction data and the new regeneration energy generation prediction data in an identical time region.

Generating schedule information includes generating, by the scheduling unit, a curve data using the difference between the load prediction data and the new regeneration energy generation prediction data; calculating, by the scheduling unit, a scheduled charging region in a lowest region $P_{load,Min}$; and generating, by the scheduling unit, a scheduled charging value $\Sigma(P_{Ck}, T_{Ck})$, including an amount of power to be charged and a charging time in the scheduled charging region, as charging schedule information.

Calculating a scheduled charging region may include stopping, by the scheduling unit, a $P_C$ scan at a point at which a sum of values obtained by multiplying an amount of power to be charged and a charging time in an identical section becomes equal to a DOD capacity $W_{DOD}$ of the ESS; and calculating the scheduled charging region.

Calculating a scheduled charging region includes calculating, by the scheduling unit, the amount of power $P_{Ck}$ to be charged and the charging time $T_{Ck}$ based on a value obtained by subtracting the difference $P_{load}$ between the load prediction data and the new regeneration energy generation prediction data in an identical time region from an amount of power $P_{C\_SCAN}$ in the scheduled charging region.

Generating schedule information includes calculating, by the scheduling unit, an amount of power to be charged based on time intervals based on the integrated schedule information, and calculating, by the scheduling unit, the target scheduled charging region; and calculating, by the scheduling unit, matrix charging schedule information by arranging the ESSs based on the time intervals in target scheduled charging regions.

Calculating matrix charging schedule information includes arranging, by the scheduling unit, the ESSs based on the characteristic information and the state information.

Calculating matrix charging schedule information includes calculating, by the scheduling unit, the matrix charging schedule information by multiplying matrix ESS information, which forms the target scheduling regions, and matrix time information based on the time intervals.

Generating the schedule information includes calculating, by the scheduling unit, a total amount of discharge based on time intervals based on the integrated schedule information, and calculating, by the scheduling unit, target scheduled discharging regions; and calculating, by the scheduling unit, matrix discharge schedule information by arranging the ESSs based on time intervals in the target scheduled discharging regions.

Calculating matrix discharge schedule information includes arranging, by the scheduling unit, the ESSs based on the characteristic information and the state information.

Calculating matrix discharge schedule information includes calculating, by the scheduling unit, the matrix discharge schedule information by multiplying matrix ESS information, which forms the target scheduled discharging regions, and matrix discharging time information based on the time intervals.

Advantageous Effects

In accordance with the present invention, the apparatus and method for scheduling ESSs have the following advantages.

First, load prediction data and new regeneration energy generation prediction data are obtained and analyzed in real time. Load leveling is performed by scheduling ESSs (e.g., scheduling the amount of discharging output and output time, and the amount of charging output and output time) based on information (e.g., a state of charge (SOC), an economical depth of discharge (DOD), and a capacity) about the ESSs using data generated as a result of the difference between the load prediction data and the new regeneration energy generation prediction data. Accordingly, cheap base power generation can be increased and expensive generation (using LNG or petroleum) can be reduced, thereby enabling economical generation.

Furthermore, an advantage arises in that the amount of power generation of new regeneration energy can be extended (or increased) because load leveling is performed by scheduling ESSs with new regeneration energy generation taken into account.

Furthermore, a plurality of ESSs can be efficiently managed in an integrated manner because charging and discharge scheduling is calculated depending on the characteristics and state of each ESS and the charging and discharge scheduling can be distributed and provided to each ESS.

Furthermore, an ESS can play the role of the load leveling or peak shaving of all electric power systems because a plurality of ESSs can be efficiently managed in an integrated manner.

BEST MODE

Figure 1:
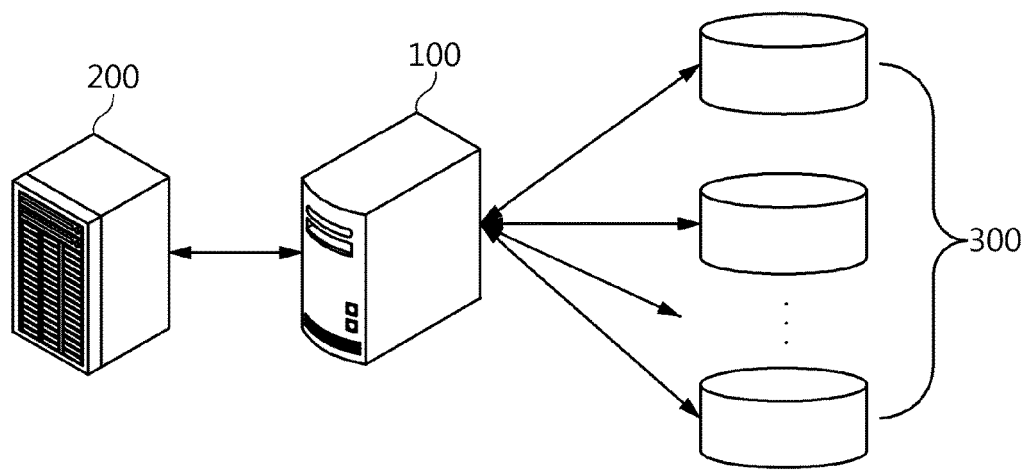
FIG. 1 is a diagram illustrating an apparatus for scheduling ESSs according to an embodiment of the present invention.

The most preferred embodiments of the present invention are described below with reference to the accompanying drawing to the extent that those skilled in the art may easily practice the technical spirit of the present invention. It should be noted that in the assignment of reference numerals to components in the drawings, the same reference numerals denote the same elements throughout the different drawings as much as possible. Furthermore, in the description of the present invention, detailed descriptions of the known functions and constitutions will be omitted if they are deemed to make the gist of the present invention unnecessarily obscure.

Figure 2:
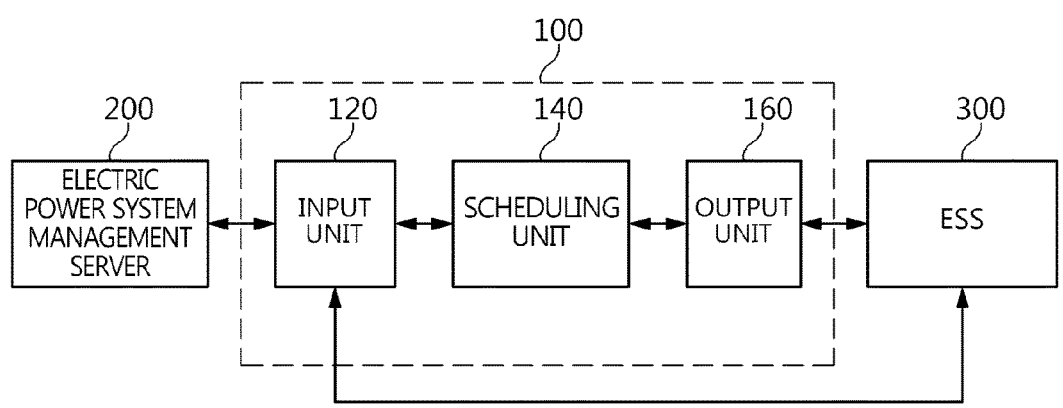
FIG. 2 is a diagram illustrating the configuration of an apparatus for scheduling ESSs according to an embodiment of the present invention.
Figure 3:
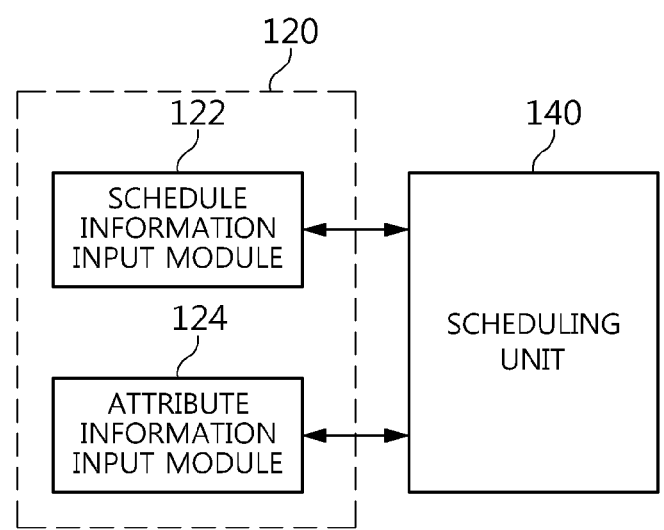
FIG. 3 is a diagram illustrating the input unit of FIG. 2.
Figure 4:
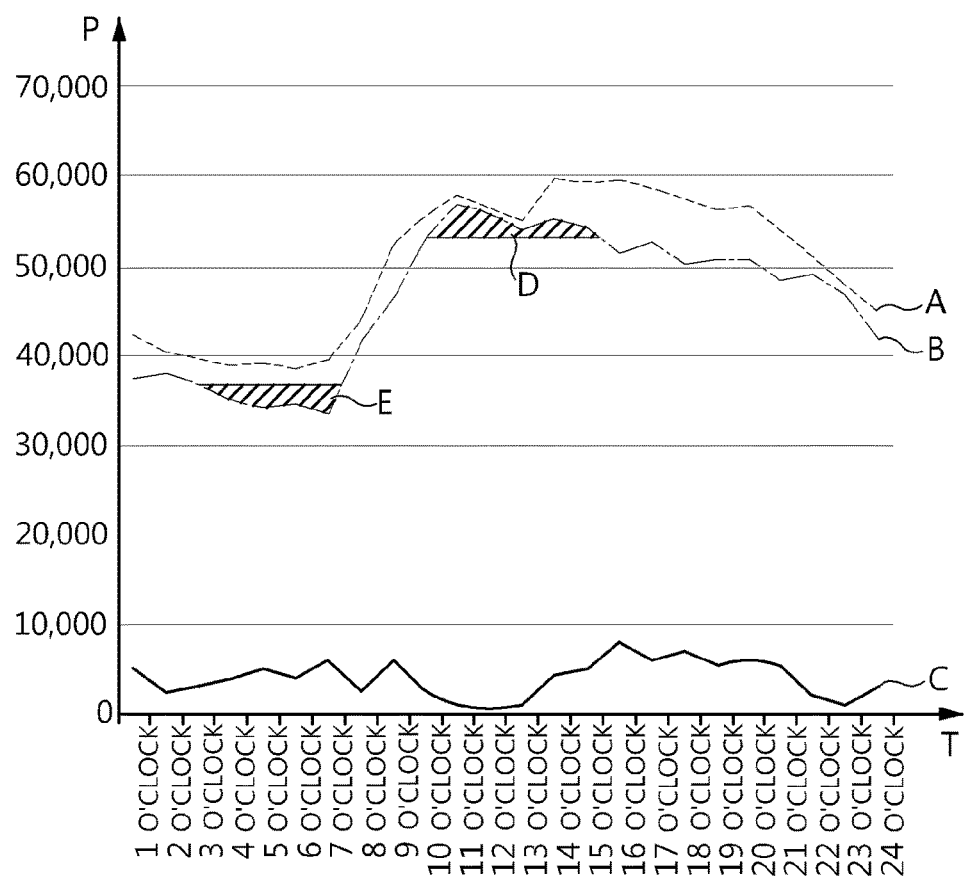
FIGS. 4 and 9 are diagrams illustrating the scheduling unit of FIG. 2.
Figure 9:
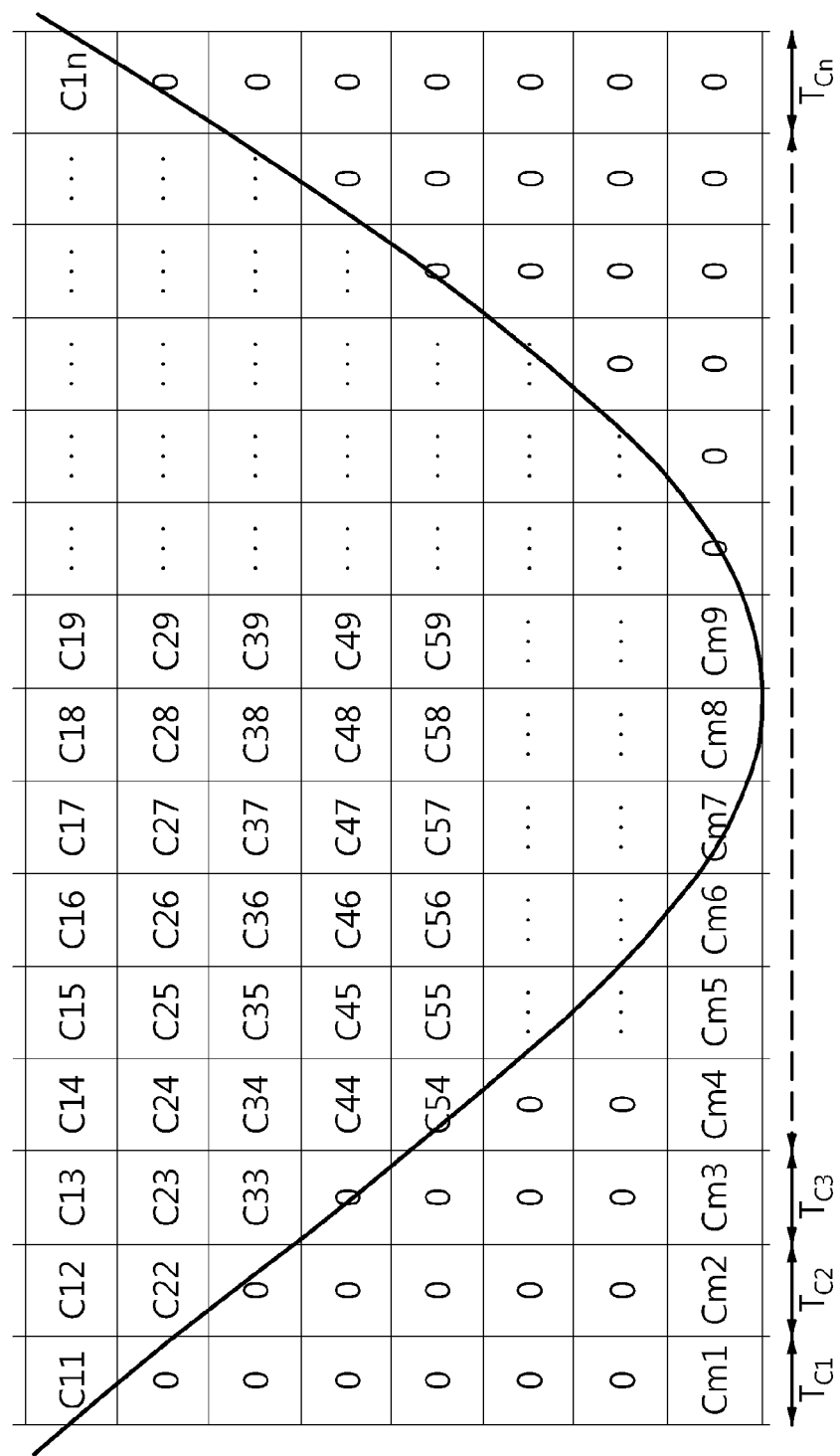
Figure 10:
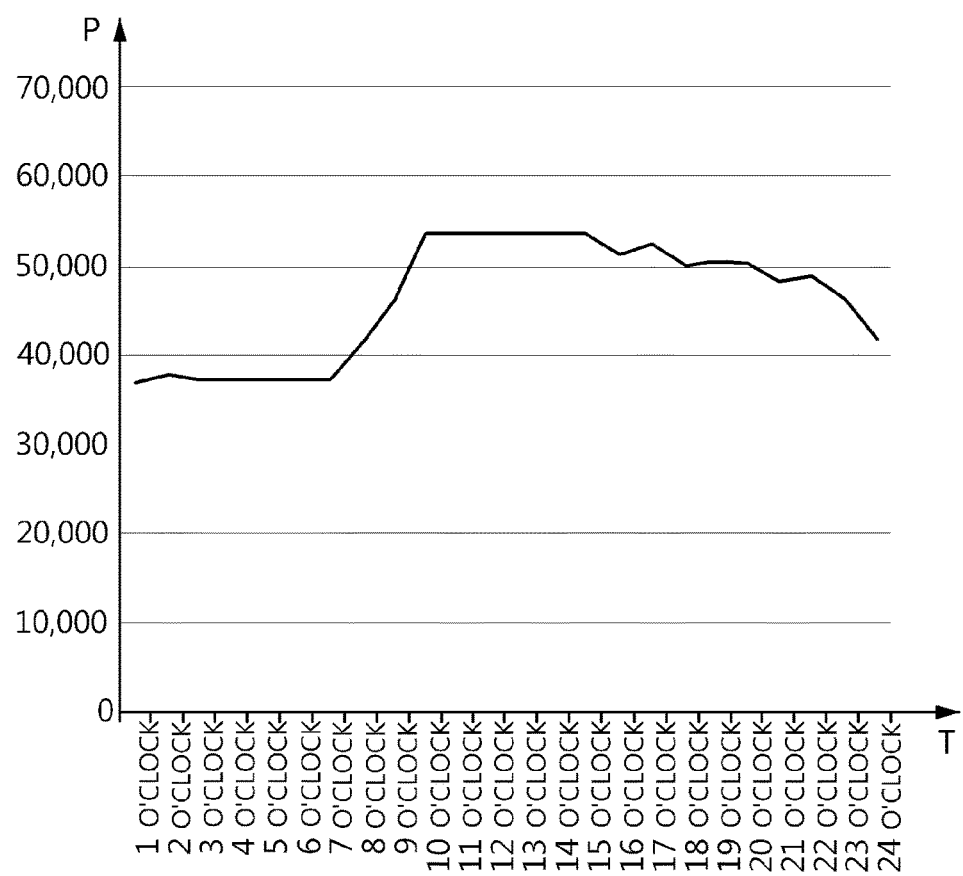
FIG. 10 is a diagram illustrating an apparatus for scheduling ESSs according to an embodiment of the present invention.

An apparatus for scheduling ESSs according to an embodiment of the present invention is described in detail below with reference to the accompanying drawing. FIG. 1 is a diagram illustrating an apparatus for scheduling ESSs according to an embodiment of the present invention. FIG. 2 is a diagram illustrating the configuration of an apparatus for scheduling ESSs according to an embodiment of the present invention. FIG. 3 is a diagram illustrating the input unit of FIG. 2. FIGS. 4 and 9 are diagrams illustrating the scheduling unit of FIG. 2. FIG. 10 is a diagram illustrating an apparatus for scheduling ESSs according to an embodiment of the present invention.

As illustrated in FIG. 1, an apparatus 100 for scheduling ESSs is connected to an electric power system management server 200 and a plurality of ESSs 300. The apparatus 100 for scheduling ESSs schedules the charging and discharging of the ESSs 300 based on data received from the electric power system management server and the ESSs 300. In this case, the apparatus 100 for scheduling ESSs generates a charging and discharging schedule in a specific cycle, and sends the charging and discharging schedule to the ESSs 300

(or a lower-level controller (not illustrated)). The ESSs 300 perform charging and discharging in accordance with the charging and discharging schedule generated by the apparatus 100 for scheduling ESSs. Accordingly, the load leveling (peak shaving) of an electric power system may be performed with new regeneration energy generation taken into account. Meanwhile, the ESSs 300 are apparatuses for converting power into physical or chemical energy, and store power when the amount of power used is small and discharge the stored power during a peak time span in which the amount of power used is large. Such ESSs 300 may be installed in various places, such as substations, power plants, and consumer places throughout the country.

As illustrated in FIG. 2, the apparatus 100 for scheduling ESSs is configured to include an input unit 120, a scheduling unit 140, and an output unit 160.

The input unit 120 receives load prediction data, new regeneration energy generation prediction data, and ESS information. That is, the input unit 120 receives the load prediction data and new regeneration energy generation prediction data of an electric power system from an electric power system management server. The input unit 120 receives ESS information from the plurality of ESSs 300. In this case, the input unit 120 receives ESS information, including a state of change (SOC), the amount of battery power based on an economical DOD, a capacity, and a DOD capacity. In this case, the input unit 120 receives load prediction data, new regeneration energy generation prediction data, and ESS information in a specific cycle (a cycle set by an administrator).

For this purpose, as illustrated in FIG. 3, the input unit 120 is configured to include a schedule information input module 122 and an attribute information input module 124.

The schedule information input module 122 receives integrated schedule information $\Sigma(P_n, T_n)$ about all the ESSs 300 from an upper-level system (i.e., the electric power system management server 200) or a user, and transfers the integrated schedule information to the scheduling unit 140. In this case, the integrated schedule information $\Sigma(P_n, T_n)$ includes information about the amounts of power to be supplied from all the ESSs 300 to loads and information about time intervals, and may be generated based on the load prediction data and the new regeneration generation prediction data. In this case, the schedule information input module 122 may periodically receive the integrated schedule information $\Sigma(P_n, T_n)$ of all the ESSs 300, and may provide the received integrated schedule information to the scheduling unit 140.

The attribute information input module 124 receives the characteristic and state information of each of the ESSs 300 from the ESSs 300 or a user, and transfers the characteristic and state information to the scheduling unit 140. In this case, the characteristic information includes information about the cycle (a short cycle or a long cycle) of each of the ESSs 300. The state information includes the SOC of each ESS 300, a DOD, the amount of battery power based on an economical DOD, and a possible output time. Likewise, the attribute information input module 124 may periodically receive the characteristic and state information of each of the ESSs 300, and may provide the received characteristic and state information to the scheduling unit 140.

The scheduling unit 140 performs the scheduling of the integrated schedule information $\Sigma(P_n, T_n)$, received from the input unit 120, using the characteristic and state information of each of the ESSs 300 received from the input unit 120. That is, the scheduling unit 140 generates the schedule of the ESSs 300 using the load prediction data, the new regeneration energy generation prediction data, and the ESS information received through the input unit 120. In this case, the schedule may be the charging schedule information or discharge schedule information of each of the ESSs 300.

The scheduling unit 140 may control the load of an electric power system by controlling the charging or discharging of each of the ESSs 300 in accordance with the charging schedule information or discharge schedule information calculated based on the integrated schedule information $\Sigma(P_n, T_n)$. In this case, the scheduling unit 140 schedules the charging and discharging of the ESSs 300 based on the difference between the load prediction data and the new regeneration energy generation prediction data.

For this purpose, the scheduling unit 140 generates a curve graph based on the received integrated schedule information $\Sigma(P_n, T_n)$. That is, the scheduling unit 140 plots load prediction data on a graph (A of FIG. 4). The scheduling unit 140 plots the new regeneration energy generation prediction data on a graph (B of FIG. 4). The scheduling unit 140 converts the difference between the load prediction data and the new regeneration energy generation prediction data into a graph (C of FIG. 4).

Figure 5:
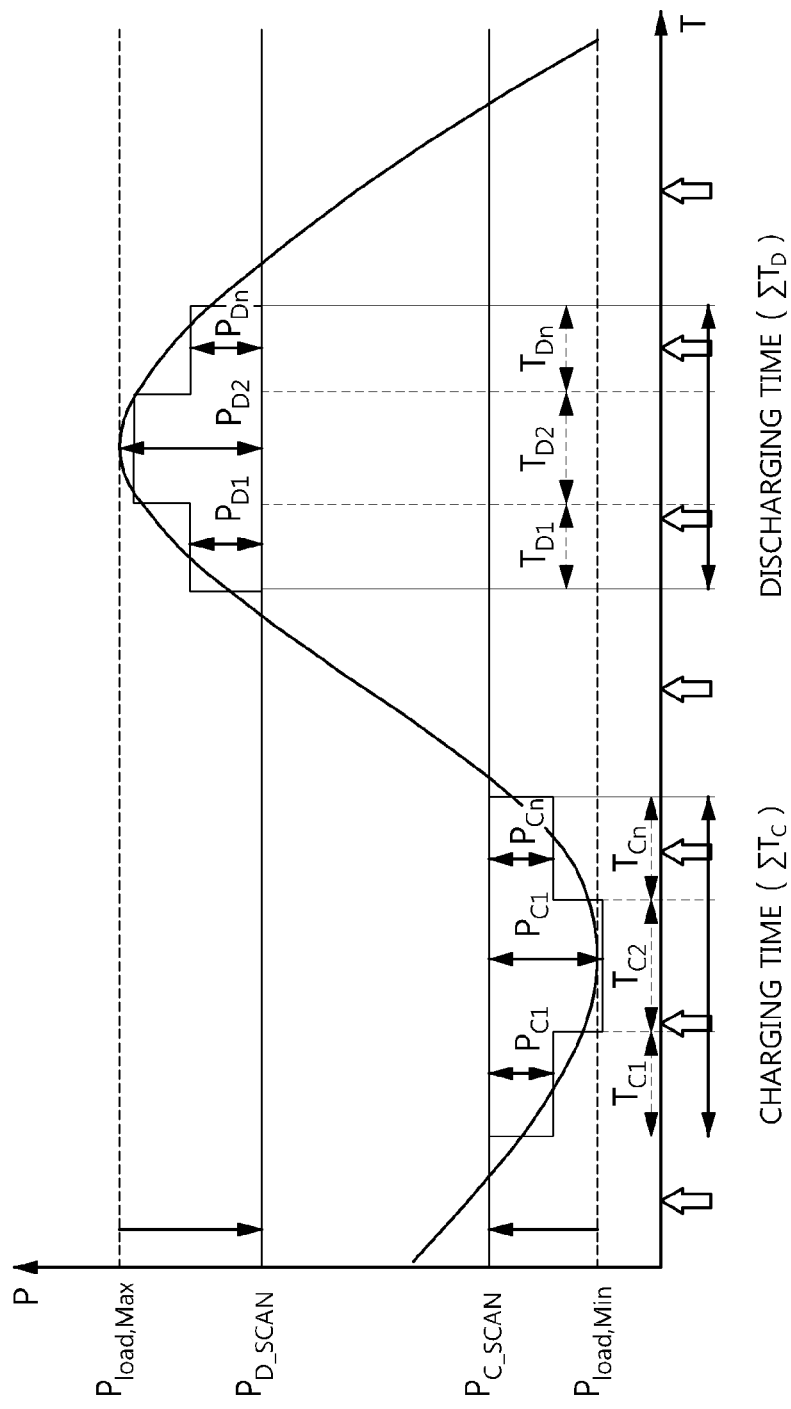

The scheduling unit 140 schedules the discharging of a corresponding ESS 300 when the difference is attached to the graph (i.e., the section D of FIG. 4). The scheduling unit 140 schedules the charging of a corresponding ESS 300 in a region (i.e., the section E of FIG. 4) in which the graph of the difference has the smallest value. That is, as illustrated in FIG. 5, a data curve includes the highest region $P_{load,Max}$ and the lowest region $P_{load,Min}$. The control of the load of an electric power system is performed by scheduling the charging and discharging of the ESSs 300 in the curve with ESS information taken into account.

In this case, FIG. 5 illustrates the difference between load prediction data and new regeneration generation prediction data. In FIG. 5, the lateral axis denotes a time interval, and the vertical axis denotes the amount of power to be supplied to a load. In a section in which the amount of power to be supplied to a load is large, a discharging operation needs to be performed in all the ESSs because the amount of power larger than that at normal times needs to be supplied. In contrast, in a section in which the amount of power to be supplied to a load is small, a charging operation needs to be performed in all the ESSs because the amount of power smaller than that at normal times has only to be supplied.

The scheduling unit 140 schedules the charging of the ESSs 300 in a region in which the difference between load prediction data and new regeneration energy generation prediction data is largest. That is, the scheduling unit 140 performs a $P_D$ scan in the largest region (hereinafter $Pd_{load,Max}$) in the curve graph (see FIG. 5) indicative of the difference between load prediction data and new regeneration energy generation prediction data.

In this case, referring to FIG. 5, the largest value $P_{load,Max}$ and the smallest value $P_{load,Min}$ in are present in the curve graph. In order to calculate discharge schedule information, $P_{D\_SCAN}$ is determined based on the largest value $P_{load,Max}$. In order to calculate charging schedule information, $P_{C\_SCAN}$ is determined based on the smallest value $P_{load,Min}$. In this case, $P_{D\_SCAN}$ is a value, that is, a reference for the computation of a scheduled discharging region in all the ESSs, and may be determined to be a value obtained by subtracting an appropriate value from $P_{load,Max}$, that is, the largest value in the curve graph.

The scheduling unit 140 sets the scheduled discharging region by stopping the $P_D$ scan at a point that is a region that becomes equal to the value of $W_{SOC}-W_{ED}$ during the $P_D$ scan based on the following Equation 1:

$$W_{SOC} - \sum_{k=1}^{n} P_{D_k} \cdot T_{D_k} = W_{ED} \tag{1}$$

where $W_{SOC}$ is the SOC of the ESS 300 (i.e., the amount of power stored in the ESS 300). $W_{ED}$ is the amount of battery power based on an economical DOD. In this case, $W_{ED}$ has the relationship of $W_{ESSs} > W_{ED} \geq 0$ with respect to $W_{ESS}$, that is, the capacity of the ESS 300, and is set to an appropriate value depending on the ESS 300. The amount of power corresponding to $W_{ED}$ may be used for frequency control when an electric power system fails.

Thereafter, the scheduling unit 140 calculates $\Sigma P_{Dk} \cdot T_{Dk}$ indicative of a scheduled discharging region with respect to each $T_{Dk}$ indicative of a discharging section.

That is, the scheduling unit 140 calculates the value of $P_{Dk}$ based on the following Equation 2 in the set scheduled discharging region. The scheduling unit 140 calculates the value of $T_{Dk}$ corresponding to the calculated $P_{Dk}$. In this case, $P_{Dk}$ is the amount of power to be discharged, $T_{Dk}$ is a discharging time, and $P_{load}$ is indicative of the value of each $T_{Dk}$ indicative of a discharging section in the curve graph:

$$P_{load} - P_{D\_SCAN} = P_{Dk} \tag{2}$$

The scheduling unit 140 generates $\Sigma(P_{Dk}, T_{Dk})$ as a scheduled discharging value based on the calculated $P_{Dk}$ and $T_{Dk}$. In this case, the amount of power corresponding to secured $W_{ED}$ may function to provide power for frequency control when a system failure occurs or in emergency.

Figure 6:
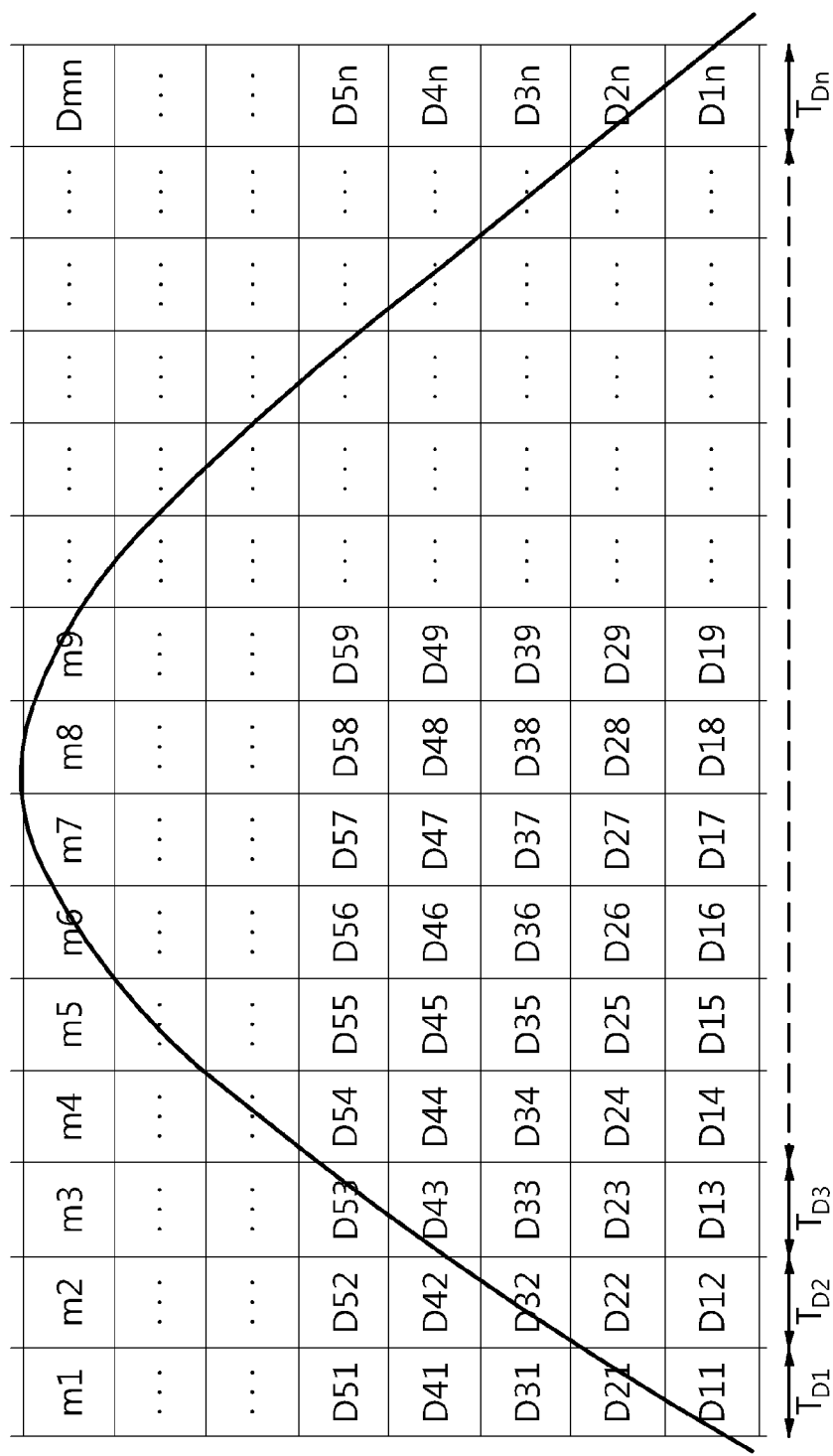
Figure 7:
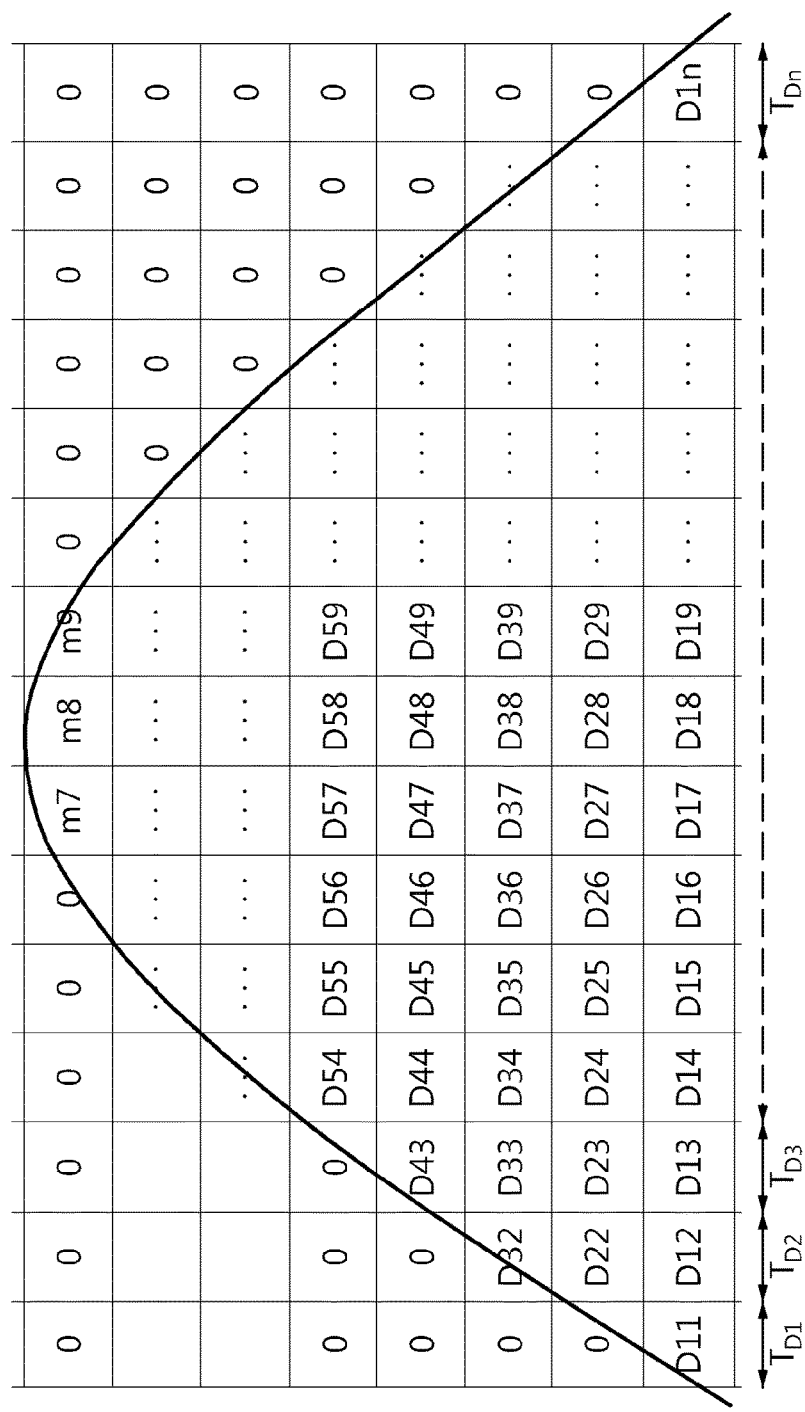

In order to distribute and provide discharge schedule information about the scheduled discharging region to each ESS 300, the scheduling unit 140 forms the curve graph of FIG. 5 and target scheduled discharging regions, formed by $P_{D\_SCAN}$, in a matrix form, as illustrated in FIGS. 6 and 7.

In this case, the lateral axis is indicative of a time interval partitioned into n ($T_{D1}$ to $T_{Dn}$) sections, and the vertical axis is indicative of m ($D_1$ to $D_m$) ESSs 300.

Accordingly, as illustrated in FIG. 6, regions that form target scheduled discharging regions may be arranged in the form of a matrix $D_{11}$ to $D_{mn}$.

Thereafter, as illustrated in FIG. 7, the scheduling unit 140 sets '0(zero)' with respect to values that deviate from a scheduled discharging region determined based on the calculated $\Sigma P_{Dk} \cdot T_{Dk}$ in $D_{11}$ to $D_{mn}$.

Accordingly, as illustrated in FIG. 7, in m ESSs 300, $D_1$ may be set so that discharging is performed during a period from $T_{D1}$ to $T_{Dn}$, and $D_m$ may be set so that discharging is performed during a period from $T_{D7}$ to $T_{D9}$.

In this case, the scheduling unit 140 may appropriately arrange the m ESSs 300 in the matrix based on the characteristic or state information of each ESS 300 that is received from the input unit 120.

For example, using information, such as a possible output time included in the cycle or state information of each of the ESSs 300 that is received from the input unit 120, the scheduling unit 140 may arrange the ESS 300 having a long cycle, in which discharging can be performed for the longest time, in $D_1$, and may arrange the ESS 300 having a short cycle, in which discharging can be performed for the shortest time, in $D_m$.

Meanwhile, a process of calculating matrix discharge schedule information as described above is described using equations.

The scheduled discharging region may be represented by the sum of possible discharging capacities of the m ESSs 300, as illustrated in the following Equation 3, and the possible discharging capacity of each ESS 300 may be represented by the following Equation 4:

$$\sum_{k=1}^{n} P_{D_k} \cdot T_{D_k} = W_{SOC} - W_{ED} = \sum_{i=1}^{m} W_{D_i} \tag{3}$$

where $W_{Di}$ is the possible discharging capacity of each ESS 300.

$$W_{D_1} = W_{SOC,1} - W_{ED,1}$$

$$W_{D_2} = W_{SOC,2} - W_{ED,2}$$

$$\cdots$$

$$W_{D_m} = W_{SOC,m} - W_{ED,m} \tag{4}$$

where $W_{SOC,m}$ is the SOC of each ESS 300 (i.e., a power state stored in the ESS 300), as described above, and $W_{ED,m}$ is the amount of battery power based on the economical DOD of each ESS 300.

Meanwhile, the amount of power $P_{Dk}$ discharged in each time interval may be expressed by the following Equation 5, and the possible discharging capacity of each ESS 300 may be expressed by the following Equation 6, which corresponds to the following Equation 7 in which the amount of power $P_{Ck}$ and the possible discharging capacities are expressed in a matrix form:

$$P_{D_1} \geq D_{11} + D_{21} + D_{31} + \ldots + D_{m1}$$

$$P_{D_2} \geq D_{12} + D_{22} + D_{32} + \ldots + D_{m2}$$

$$\cdots$$

$$P_{D_n} \geq D_{1n} + D_{2n} + D_{3n} + \ldots + D_{mn} \tag{5}$$

where n is a parameter for classifying the time intervals. Accordingly, $P_{Dn}$ is the amount of power to be discharged from all the ESSs 300 during the time interval $T_{Dn}$.

$$\sum_{i=1}^{m} W_{D_i} = (P_{D_1} P_{D_2} P_{D_3} \cdots P_{D_n}) \cdot \sum_{i=1}^{n} T_{D_k} \tag{6}$$

where $W_{Di}$ is the possible discharging capacity of each ESS 300.

$$\begin{pmatrix} W_{D_1} \\ W_{D_2} \\ W_{D_3} \\ \cdots \\ W_{D_m} \end{pmatrix} = \begin{pmatrix} D_{11} & D_{12} & D_{13} & \cdots & D_{1n} \\ D_{21} & D_{22} & D_{23} & \cdots & D_{2n} \\ D_{31} & D_{32} & D_{33} & \cdots & D_{3n} \\ \cdots & \cdots & \cdots & \cdots & \cdots \\ D_{m1} & D_{m2} & D_{m3} & \cdots & D_{mn} \end{pmatrix} \cdot \begin{pmatrix} T_{D_1} \\ T_{D_2} \\ T_{D_3} \\ \cdots \\ T_{D_n} \end{pmatrix} \tag{7}$$

Furthermore, the discharge schedule information to be distributed to each ESS 300 in accordance with the matrix of Equation 7 may be expressed by the following Equation 8:

$$W_{D_1} = D_{11} T_{D_1} + D_{12} T_{D_1} + D_{13} T_{D_1} + \cdots + D_{1n} T_{D_n} \tag{8}$$

$$= \sum_{i=1}^{n} D_{1i} T_{D_i}$$

$$\cdots$$

$$W_{D_m} = D_{m1} T_{D_1} + D_{m2} T_{D_1} + D_{m3} T_{D_1} + \cdots + D_{mn} T_{D_n}$$

$$= \sum_{i=1}^{n} D_{mi} T_{D_i}$$

Accordingly, the discharge schedule information to be distributed to each ESS 300 may be calculated as $\Sigma(D_{1m}, T_{Dn}), \Sigma(D_{2n}, T_{Dn}), \ldots, \Sigma(D_{mn}, T_{Dn})$.

In this case, D, corresponds to the amount of discharge to be distributed to an m-th ESSs 300 during an n-th time interval, and $T_{Dn}$ is the n-th time interval. The scheduling unit 140 schedules the charging of the ESS 300 in a region in which the difference between load prediction data and new regeneration energy generation prediction data is minimum. That is, the scheduling unit 140 performs a $P_C$ scan in the lowest region (hereinafter $P_{load,Min}$) of the curve graph (see FIG. 5) indicative of the difference between the load prediction data and the new regeneration energy generation prediction data. In this case, $P_{C\_SCAN}$ is a value, that is, a reference for calculating the scheduled charging region in all the ESSs 300, and may be determined to be a value obtained by appropriately increasing $P_{load,min}$, that is, a minimum value in the curve graph.

The scheduling unit 140 stops the $P_C$ scan at a point that enters a region that becomes equal to the value of $W_{DOD}$ during the $P_C$ scan based on the following Equation 9, and sets the scheduled charging region. That is, the scheduling unit 140 sets a region in which the value of $\Sigma P_{Ck} \cdot T_{Ck}$ becomes equal to $W_{DOD}$ based on Equation 9 as $P_{C\_SCAN}$.

$$\sum_{k=1}^{m} P_{C_k} \cdot T_{C_k} - W_{DOD} = 0 \tag{9}$$

In Equation 9, $W_{DOD}$ is the DOD capacity of the ESSs 300 (i.e., a chargeable power capacity in a power capacity state that is discharged to the ESS 300).

Thereafter, the scheduling unit 140 calculates the value of $P_{Ck}$ based on the following Equation 9 in the set scheduled charging region. That is, the scheduling unit 140 calculates $P_{Ck}$ in accordance with Equation 10 with respect to each $T_{Ck}$ indicative of the charging section, and calculates $\Sigma P_{Ck} \cdot T_{Ck}$ indicative of the scheduled charging region.

The scheduling unit 140 calculates the value of $T_{Ck}$ corresponding to the calculated $P_{Dk}$. In this case, $P_{Ck}$ is the amount of power to be charged, $T_{Ck}$ is a charging time, and $P_{load}$ is a value in the curve graph of each $T_{Ck}$ indicative of the charging section.

$$P_{C\_SCAN} - P_{load} = P_{C_k} \tag{10}$$

The scheduling unit 140 generates $\Sigma(P_{Ck}, T_{Ck})$ as a scheduled charging value based on the calculated $P_{Ck}$ and $T_{Ck}$.

Figure 8:
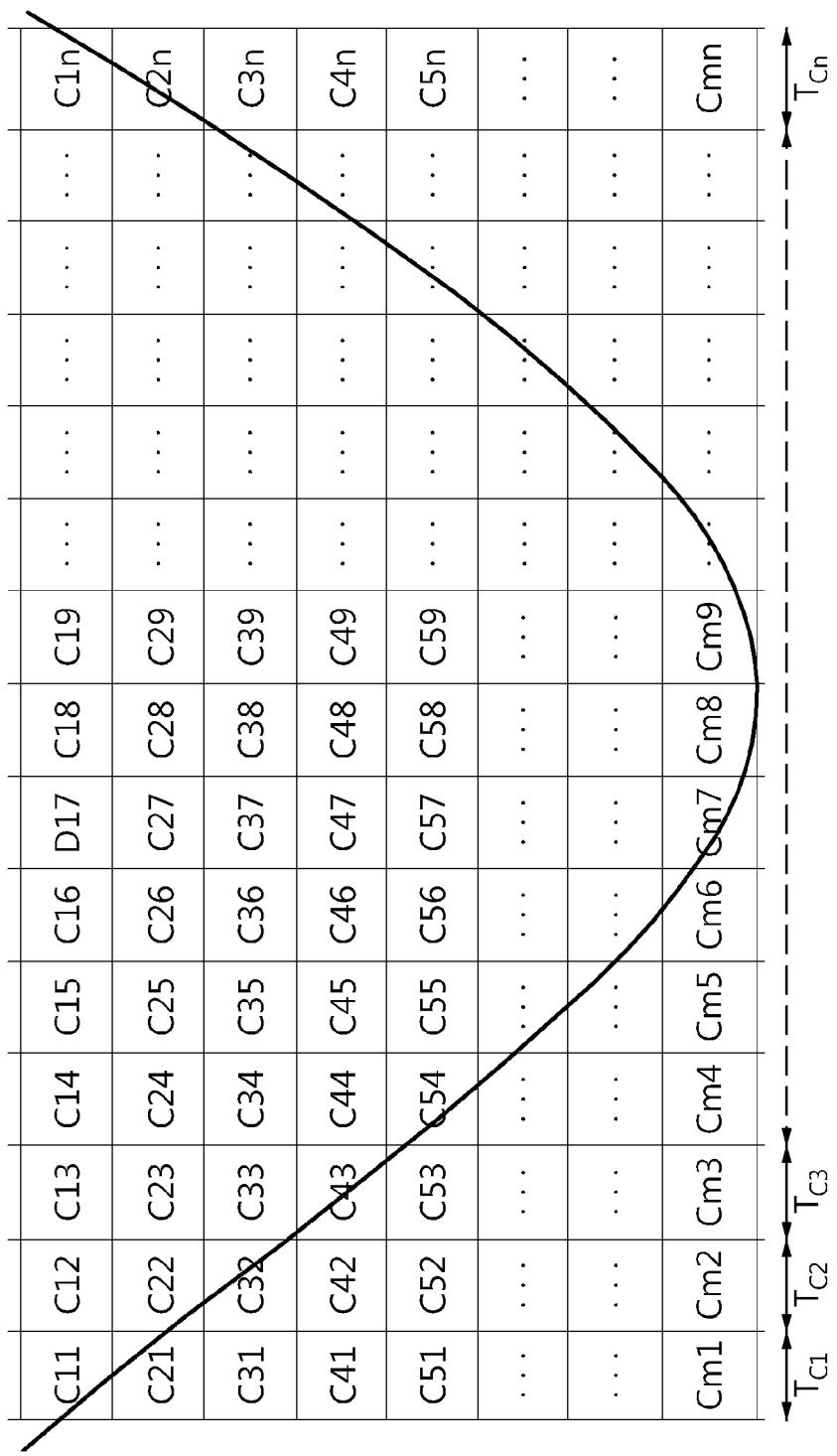

In order to distribute and provide the charging schedule information of the scheduled charging region to each ESS 300, the scheduling unit 140 forms the curve graph of FIG. 5 and target scheduled charging regions, formed by $P_{C\_SCAN}$, in a matrix form, as illustrated in FIGS. 8 and 9.

In this case, the lateral axis is indicative of a time interval partitioned into n ($T_{C1}$ to $T_{Cn}$) sections, and the vertical axis is indicative of the m ($C_1$ to $C_m$) ESSs 300.

Accordingly, as illustrated in (a) of FIG. 5, regions that form the respective target scheduled charging regions may be formed as $C_{11}$ to $C_{mn}$ in a matrix form.

Thereafter, as illustrated in FIG. 8, the scheduling unit 140 sets values that belong to $C_{11}$ to $C_{mn}$ and that deviate from the scheduled charging region determined based on the calculated $\Sigma P_{Ck} \cdot T_{Ck}$ as '0(zero)'.

Accordingly, as illustrated in FIG. 9, in the m ESSs 300, $C_1$ may be set so that charging is performed during a period from $T_{C1}$ to $T_{Cn}$, and $C_m$ may be set so that charging is performed during a period from $T_{C7}$ to $T_{C9}$.

In this case, the scheduling unit 140 may appropriately arrange the m ESSs 300 based on the characteristic and state information of each ESS 300 that are received from the input unit 120.

For example, using information, such a possible output time that is included in the cycle information or state information about of each of the ESSs 300 that is received from the input unit 120, the scheduling unit 140 arranges an ESS 300 having a long cycle in which charging can be performed for the longest time in $C_1$ and arranges an ESS 300 having a short cycle in which charging can be performed for the shortest time in $C_m$.

Meanwhile, a process of calculating the matrix charging schedule information as described above is described through equations.

The scheduled charging region may be expressed by the sum of the chargeable capacities of the m ESSs 300 as illustrated in the following Equation 11, and the chargeable capacity of each ESS 300 may be expressed by the following Equation 12:

$$\sum_{k=1}^{n} P_{C_k} \cdot T_{C_k} = W_{DOD} = \sum_{i=1}^{m} W_{C_i} \tag{11}$$

where $W_{Ci}$ is the chargeable capacity of each ESS 300.

$$W_{C_1} = W_{DOD,1}$$

$$W_{C_2} = W_{DOD,2}$$

$$\ldots$$

$$W_{C_m} = W_{DOD,m} \tag{12}$$

where $W_{DOD,m}$ is the DOD capacity of each ESS 300 (a chargeable power capacity in a power capacity state that is discharged to the ESS 300).

Meanwhile, the amount of power $P_{Ck}$ charged in each time span may be expressed as the following Equation 13, and the chargeable capacity of each ESS 300 may be expressed as Equation 14, which corresponds to Equation 15 in which the amount of power $P_{Ck}$ and the chargeable capacities are expressed in a matrix form:

$$P_{C_1} \geq C_{11} + C_{21} + C_{31} + \ldots + C_{m1}$$

$$P_{C_2} \geq C_{12} + C_{22} + C_{32} + \ldots + C_{m2}$$

$$\ldots$$

$$P_{C_n} \geq C_{1n} + C_{2n} + C_{3n} + \ldots + C_{mn} \tag{13}$$

where n is a parameter for classifying the time interval. Accordingly, $P_{Cn}$ is the amount of power to be charged by all the ESSs 300 during the time interval of $T_{Cn}$.

$$\sum_{i=1}^{m} W_{C_i} = (P_{C_1} P_{C_2} P_{C_3} \cdots P_{C_n}) \cdot \sum_{i=1}^{n} T_{C_i} \tag{14}$$

where $W_{Ci}$ is the chargeable capacity of each ESS 300.

$$\begin{pmatrix} W_{C_1} \\ W_{C_2} \\ W_{C_3} \\ \cdots \\ W_{C_m} \end{pmatrix} = \begin{pmatrix} C_{11} & C_{12} & C_{13} & \cdots & C_{1n} \\ C_{21} & C_{22} & C_{23} & \cdots & C_{2n} \\ C_{31} & C_{32} & C_{33} & \cdots & C_{3n} \\ \cdots & \cdots & \cdots & \cdots & \cdots \\ C_{m1} & C_{m2} & C_{m3} & \cdots & C_{mn} \end{pmatrix} \cdot \begin{pmatrix} T_{C_1} \\ T_{C_2} \\ T_{C_3} \\ \cdots \\ T_{C_n} \end{pmatrix} \quad (15)$$

Furthermore, the charging schedule information to be distributed to each ESS 300 in accordance with the matrix of Equation 15 may be expressed as the following Equation 16:

$$W_{C_1} = C_{11}T_{C_1} + C_{12}T_{C_2} + C_{13}T_{C_3} + \cdots + C_{1n}T_{C_n} \quad (16)$$
$$= \sum_{i=1}^{n} C_{li}T_{C_i}$$
$$\cdots$$
$$W_{D_m} = C_{m1}T_{C_1} + C_{m2}T_{D_2} + C_{m3}T_{C_3} + \cdots + C_{mn}T_{C_n}$$
$$= \sum_{i=1}^{n} C_{mi}T_{C_i}$$

Accordingly, the charging schedule information to be distributed and provided to each ESS 300 may be calculated as $\Sigma(C_{1n}, T_{Cn}), \Sigma(C_{2n}, T_{Cn}), \ldots, \Sigma(C_{mn}, T_{Cn})$.

In this case, $C_{mn}$ corresponds to the amount of charging to be distributed to the m-th ESSs 300 during the n-th time interval, and $T_{Cn}$ is the n-th time interval.

The scheduling unit 140 sends the generated scheduled discharging value $\Sigma(P_{Dk}, T_{Dk})$ and scheduled charging value $\Sigma(P_{Ck}, T_{Ck})$ to the output unit 160. In this case, the scheduling unit 140 generates the scheduled discharging value and scheduled charging value in a specific cycle (a cycle set by an administrator), and sends the scheduled discharging value and scheduled charging value to the output unit 160.

As described above, in accordance with the apparatus and method for scheduling ESSs according to the present invention, the plurality of ESSs 300 can be efficiently managed in an integrated manner because charging and discharge scheduling can be calculated depending on the characteristics and state of each ESS 300 and can be distributed and provided to each ESS 300.

Furthermore, since the plurality of ESSs 300 can be efficiently managed in an integrated manner, the ESSs 300 can be used for the load leveling or peak shaving of the entire electric power system.

The output unit 160 sends the schedule of the ESSs 300, generated by the scheduling unit 140, to the ESSs 300 or a lower-level controller (not illustrated). That is, the output unit 160 sends the scheduled discharging value $\Sigma(P_{Dk}, T_{Dk})$ and the scheduled charging value $\Sigma(P_{Ck}, T_{Ck})$ to each ESS 300 or a lower-level controller (not illustrated) for the control of the load (i.e., peak shaving, load leveling) of the electric power system.

FIG. 10 is a graph illustrating the amount of power generation obtained as a result of load leveling using the apparatus 100 for scheduling ESSs. A load capacity needs to be equal to the sum of the amount of power generation of new regeneration energy, the output value of the ESS 300, and the amount of power generation. The data of the amount of power generation, such as that of FIG. 10, may be obtained because the amount of power generation is obtained by subtracting the amount of power generation of new regeneration energy and the output value of the ESS 300 from a load capacity. From the graph, it may be seen that the amount of power generation has become flat before the apparatus 100 for scheduling ESSs is applied, compared to the graph of the load prediction data of FIG. 4.

Accordingly, load leveling is performed by obtaining and analyzing load prediction data and new regeneration energy generation prediction data in real time and then scheduling the ESSs 300 (e.g., scheduling the amount of discharging output and output time, and the amount of charging output and output time) based on information (e.g., an SOC, an economic DOD, and a capacity) about the ESSs 300 using data generated as a result of the difference between the load prediction data and the new regeneration energy generation prediction data. Accordingly, economical power generation can be performed because cheap base power generation can be increased and expensive power generation (using LNG or petroleum) can be reduced.

Furthermore, an advantage arises in that the amount of power generation of new regeneration energy can be extended (or increased) by scheduling the ESS 300 with new regeneration energy generation and performing load leveling taken into account.

Figure 11:
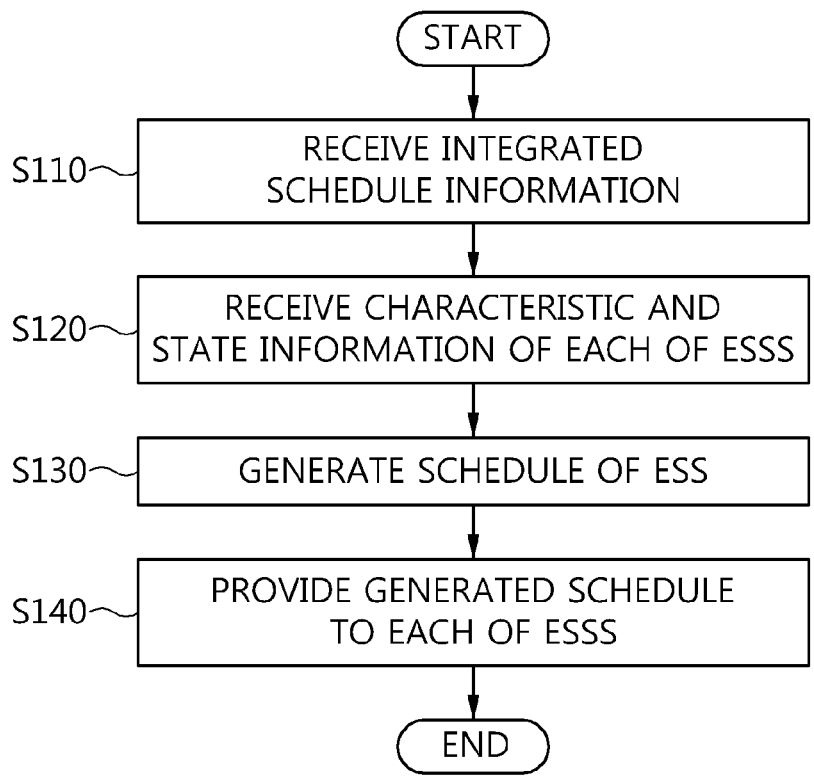
FIG. 11 is a flowchart illustrating a method of scheduling ESSs according to an embodiment of the present invention.

A method of scheduling ESSs according to an embodiment of the present invention is described in detail below with reference to the accompanying drawings. FIG. 11 is a flowchart illustrating the method of scheduling ESSs according to an embodiment of the present invention.

First, the input unit 120 receives the integrated schedule information of all the ESSs 300 at step S110. That is, the input unit 120 receives the integrated schedule information (i.e., $\Sigma(P_n, T_n)$). In this case, the integrated schedule information $\Sigma(P_n, T_n)$ includes information about the amount of power to be supplied from all the ESSs 300 to a load and time interval information, and may be calculated based on load prediction data and new regeneration generation prediction data. The input unit 120 sends the received integrated schedule information to the scheduling unit 140.

The input unit 120 receives the characteristic and state information of each of the ESSs 300 at step S120. That is, the input unit 120 receives the characteristic information, including information about the cycle (a short cycle or a long cycle) of each of the ESSs 300, and the state information, including the SOC of each ESS 300, a DOD, the amount of battery power based on an economical DOD, and a possible output time. The input unit 120 sends the received characteristic and state information of the ESSs 300 to the scheduling unit 140.

The scheduling unit 140 generates the schedule of the ESSs 300 based on the integrated schedule information, the characteristic information, and the state information received from the input unit 120 at step S130. In this case, the scheduling unit 140 generates the schedule, including at least one of a scheduled discharging value and a scheduled charging value, based on the integrated schedule information, the characteristic information, and the state information. The scheduling unit 140 sends a previously generated schedule to the output unit 160.

The output unit 160 provides each of the ESSs 300 with the schedule generated by the scheduling unit 140 (S140). That is, the output unit 160 sends the schedule, received from the scheduling unit 140, to the ESSs 300 (or a lower-level controller), and the ESSs 300 perform charging or discharging according to the schedule.

Figure 12:
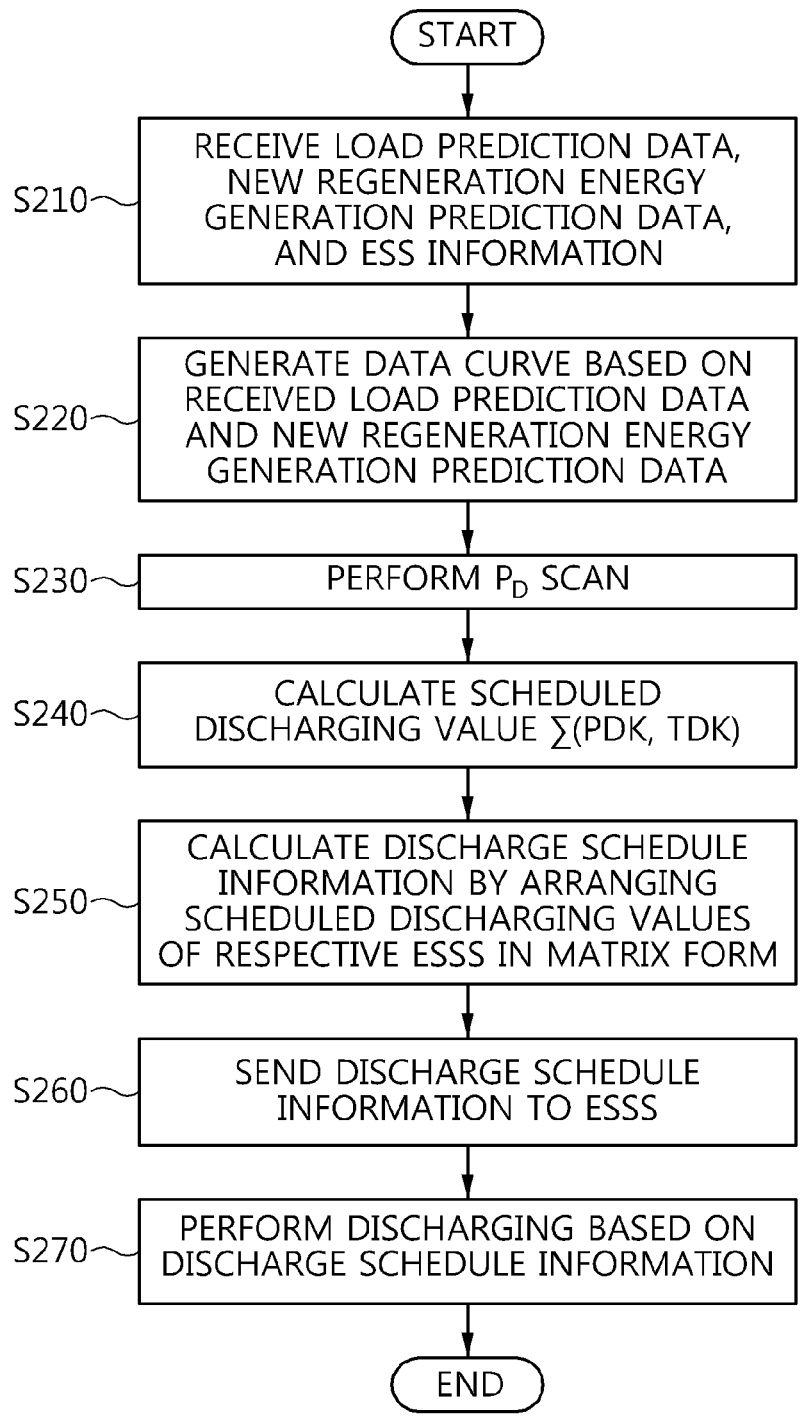
FIG. 12 is a flowchart illustrating a discharging scheduling method in the method of scheduling ESSs according to an embodiment of the present invention.

A discharging scheduling method in the method of scheduling ESSs according to an embodiment of the present invention is described in detail below with reference to the accompanying drawings. FIG. 12 is a flowchart illustrating the discharging scheduling method in the method of scheduling ESSs according to an embodiment of the present invention.

First, the input unit 120 receives load prediction data, new regeneration energy generation prediction data, and ESS information at step S210. In this case, the input unit 120 receives the ESS information including an SOC, the amount of battery power based on an economical DOD, and a capacity. The input unit 120 sends the received load prediction data, new regeneration energy generation prediction data, and ESS information to the scheduling unit 140.

The scheduling unit 140 generates a data curve based on the received load prediction data and new regeneration energy generation prediction data at step S220. That is, the scheduling unit 140 calculates the difference between the load prediction data and the new regeneration energy generation prediction data in each time span. The scheduling unit 140 generates the curve graph using the calculated values in the time spans.

The scheduling unit 140 performs a $P_D$ scan on the generated data curve at step S230. That is, the scheduling unit 140 sets a $P_D$ scan region in the highest region $P_{load,Max}$ of the data curve based on Equation 1.

The scheduling unit 140 calculates a scheduled discharging value at step S240. That is, the scheduling unit 140 stops the $P_D$ scan at a point that enters a region that becomes equal to the value of $W_{SOC-WED}$ during the $P_D$ scan. The scheduling unit 140 calculates $P_{Dk}$ in accordance with Equation 2. Thereafter, the scheduling unit 140 calculates the value of $T_{Dk}$ corresponding to previously calculated $P_{Dk}$ in accordance with Equation 1. The scheduling unit 140 generates $\Sigma(P_{Dk,\ TDk})$ as a scheduled discharging value based on the previously calculated $P_{Dk}$ and $T_{Dk}$.

The scheduling unit 140 calculates discharge schedule information to be distributed and provided to the ESSs 300 by arranging the previously calculated scheduled discharging values of the respective ESSs 300 in a matrix form at step S250.

The scheduling unit 140 sends the generated discharge schedule information to the output unit 160. The output unit 160 sends the discharge schedule information, received from the scheduling unit 140, to the ESSs 300 (or a lower-level controller) at step S260. The ESSs 300 perform discharge based on the discharge schedule information at step S270.

Figure 13:
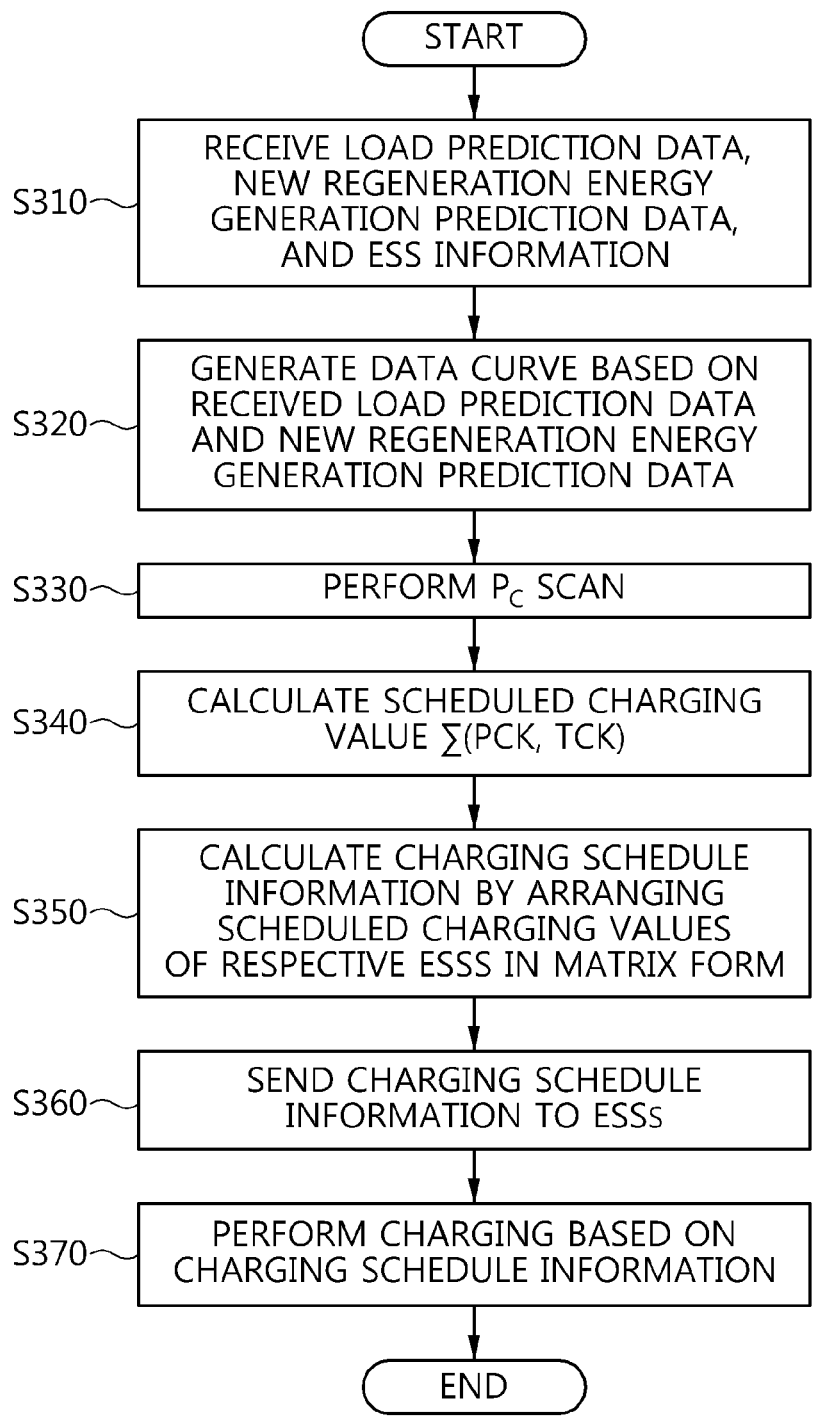
FIG. 13 is a flowchart illustrating a charging scheduling method in the method of scheduling ESSs according to an embodiment of the present invention.

A charging scheduling method in the method of scheduling ESSs according to an embodiment of the present invention is described in detail below with reference to the accompanying drawings. FIG. 13 is a flowchart illustrating the charging scheduling method in the method of scheduling ESSs according to an embodiment of the present invention.

First, the input unit 120 receives load prediction data, new regeneration energy generation prediction data, and ESS information at step S310. In this case, the input unit 120 receives the ESS information, including an SOC, the amount of battery power based on an economical DOD, and a capacity. The input unit 120 sends the received load prediction data, new regeneration energy generation prediction data, and ESS information to the scheduling unit 140.

The scheduling unit 140 generates a data curve based on the received load prediction data and new regeneration energy generation prediction data at step S320. That is, the scheduling unit 140 calculates the difference between the load prediction data and the new regeneration energy generation prediction data in each of time spans. The scheduling unit 140 generates the curve graph using the calculated values in the time spans.

The scheduling unit 140 performs a $P_C$ scan on the generated data curve at step S330. That is, the scheduling unit 140 sets a $P_C$ scan region in the lowest region $P_{load,Min}$ of the data curve in accordance with Equation 9.

The scheduling unit 140 calculates a scheduled charging value at step S340. That is, the scheduling unit 140 stops the $P_C$ scan at a point that becomes a region that becomes equal to the value of $W_{DOD}$ during the $P_C$ scan. The scheduling unit 140 calculates $P_{Ck}$ in accordance with Equation 10. Thereafter, the scheduling unit 140 calculates the value of $T_{Ck}$ corresponding to previously calculated $P_{Ck}$ in accordance with Equation 9. The scheduling unit 140 generates $\Sigma(P_{Ck,\ TCk})$ as the scheduled charging value based on the previously calculated $P_{Ck}$ and $T_{Ck}$.

The scheduling unit 140 arranges the previously calculated scheduled charging values of the respective ESSs 300 in a matrix form, and calculates charging schedule information to be distributed and provided to the ESSs 300 at step S350.

The scheduling unit 140 sends the generated charging schedule information to the output unit 160. The output unit 160 sends the charging schedule information, received from the scheduling unit 140, to the ESSs 300 (or a lower-level controller) at step S360. The ESSs 300 perform discharge based on the charging schedule information at step S370.

As described above, in accordance with the apparatus and method for scheduling ESSs, load leveling is performed by obtaining and analyzing load prediction data and new regeneration energy generation prediction data in real time and then scheduling the ESSs 300 (e.g., scheduling the amount of discharging output and output time, and the amount of charging output and output time) the based on information (e.g., an SOC, an economic DOD, and a capacity) about the ESSs 300 using data generated as a result of the difference between the load prediction data and the new regeneration energy generation prediction data. Accordingly, economical power generation can be performed because cheap base power generation can be increased and expensive power generation (using LNG or petroleum) can be reduced.

Furthermore, the apparatus and method for scheduling ESSs are advantageous in that they can extend (or increase) the amount of power generation of new regeneration energy because they perform load leveling by scheduling the ESSs 300 with new regeneration energy generation taken into account.

Furthermore, the apparatus and method for scheduling ESSs can efficiently manage the plurality of ESSs 300 in an integrated manner because they calculate a charging and discharge schedule depending on the characteristics and state of each ESS 300 and distribute and provide the calculated charging and discharge schedule to the ESSs 300.

Furthermore, in the apparatus and method for scheduling ESSs, the plurality of ESSs 300 can be efficiently managed in an integrated manner, and thus the ESSs 300 may be used for the purpose of performing the load leveling or peak shaving of the entire electric power system.

Although the preferred embodiments of the present invention have been described above, the present invention may be modified in various ways. It will be understood by those skilled in the art to which the present invention pertains that various change examples and modification examples may be implemented without departing the claims of the present invention.

The invention claimed is:

1. An apparatus for scheduling energy storage systems (ESSs), comprising:
   an input unit configured to receive integrated schedule information, characteristic information and state information of the ESSs;
   a scheduling unit configured to generate schedule information of the ESSs, including at least one of charging schedule information and discharging schedule information, based on the received integrated schedule information, characteristic information and state information, wherein the scheduling unit is configured to generate at least one of the charging schedule information and the discharging schedule information of the ESSs based on a difference between load prediction data and new regeneration energy generation prediction data; and an output unit configured to output the generated schedule information to the ESSs, wherein the ESSs perform charging and discharging according to the schedule information obtained from the output unit, and wherein the scheduling unit calculates target scheduling regions based on the integrated schedule information, and calculates matrix schedule information by arranging the ESSs based on time intervals in the target scheduling regions.

2. The apparatus of claim 1, wherein:

the input unit further receives the load prediction data and the new regeneration energy generation prediction data; and the scheduling unit calculates a scheduled discharging region in a highest region $P_{load,Max}$ of a curve data generated using the difference between the load prediction data and the new regeneration energy generation prediction data, and generates a scheduled discharging value $\Sigma(P_{Dk}, T_{Dk})$, including an amount of power to be discharged and a discharging time in the scheduled discharging region, as discharge schedule information.

3. The apparatus of claim 2, wherein the scheduling unit stops a $P_D$ scan at a point at which a sum of values obtained by multiplying an amount of power to be discharged and a discharging time in an identical section becomes equal to a value obtained by subtracting an amount of battery power $W_{ED}$ based on an economical DOD from an SOC $W_{SOC}$ of each ESS, and calculates the scheduled discharging region.

4. The apparatus of claim 3, wherein the scheduling unit calculates the amount of power $P_{Dk}$ to be discharged and discharging time $T_{Dk}$ based on a value obtained by subtracting an amount of power $P_{D\_SCAN}$ in the scheduled discharging region from a difference $P_{load}$ between the load prediction data and the new regeneration energy generation prediction data in an identical time region.

5. The apparatus of claim 1, wherein:

the input unit further receives the load prediction data and the new regeneration energy generation prediction data; and the scheduling unit calculates a scheduled charging region in a lowest region $P_{load,Min}$ of a curve data generated using the difference between the load prediction data and the new regeneration energy generation prediction data, and generates a scheduled charging value $\Sigma(P_{Ck}, T_{Ck})$, including an amount of power to be charged and a charging time in the scheduled charging region, as charging schedule information.

6. The apparatus of claim 5, wherein the scheduling unit stops $P_C$ scan at a point at which a sum of values obtained by multiplying an amount of power to be charged and a charging time in an identical section becomes equal to a DOD capacity $W_{DOD}$ of the ESS, and calculates the scheduled charging region.

7. The apparatus of claim 6, wherein the scheduling unit calculates the amount of power $P_{Ck}$ to be charged and a charging time $T_{Ck}$ based on a value obtained by subtracting the difference $P_{load}$ between the load prediction data and the new regeneration energy generation prediction data in an identical time region from an amount of power $P_{C\_SCAN}$ in the scheduled charging region.

8. The apparatus of claim 1, wherein the scheduling unit arranges the ESSs based on the characteristic information and the state information.

9. The apparatus of claim 1, wherein the scheduling unit calculates the matrix schedule information by multiplying matrix ESS information, which forms the target scheduling regions, and matrix time information based on the time intervals.

10. A method of scheduling energy storage systems (ESSs), comprising:

receiving, by an input unit, integrated schedule information, characteristic information, and state information of the ESSs;

generating, by a scheduling unit, schedule information of the ESSs based on the received integrated schedule information, characteristic information and state information, wherein the scheduling unit is configured to generate at least one of charging schedule information and discharging schedule information of the ESSs based on a difference between load prediction data and new regeneration energy generation prediction data; and outputting, by an output unit, the generated schedule information to the ESSs, wherein the ESSs perform charging and discharging according to the schedule information, wherein generating schedule information comprises:

calculating, by the scheduling unit, at least one of an amount of power to be charged and a total amount of power to be discharged based on time intervals based on the integrated schedule information, and calculating, by the scheduling unit, the target scheduled charging region; and calculating, by the scheduling unit, at least one of target scheduled charging regions and target scheduled discharging regions based on at least one of the calculated amount of power to be charged and the calculated total amount of power to be discharged; and calculating, by the scheduling unit, matrix schedule information, including at least one of scheduled charging information and scheduled discharging information, by arranging the ESSs according to the time intervals in at least one of the target scheduled charging regions and the target scheduled discharging regions.

11. The method of claim 10, wherein:

receiving the integrated schedule information, the characteristic information and the state information of the ESSs comprises further receiving, by the input unit, the load prediction data and the new regeneration energy generation prediction data; and generating schedule information comprises:

generating, by the scheduling unit, a curve data using the difference between the load prediction data and the new regeneration energy generation prediction data;

calculating, by the scheduling unit, a scheduled discharging region in a highest region $P_{load,Max}$; and generating, by the scheduling unit, a scheduled discharging value $\Sigma(P_{Dk}, T_{Dk})$, including an amount of power to be discharged and a discharging time in the scheduled discharging region, as discharge schedule information.

12. The method of claim 11, wherein calculating a scheduled discharging region comprises:

stopping, by the scheduling unit, a $P_D$ scan at a point at which a sum of values obtained by multiplying an amount of power to be discharged and a discharging time in an identical section becomes equal to a value obtained by subtracting an amount of battery power $W_{ED}$ based on an economical DOD from an SOC $W_{SOC}$ of each ESS; and calculating the scheduled discharging region.

13. The method of claim 12, wherein calculating a scheduled discharging region comprises calculating, by the scheduling unit, the amount of power $P_{Dk}$ to be discharged and discharging time $T_{Dk}$ based on a value obtained by subtracting an amount of power $P_{D\_SCAN}$ in the scheduled discharging region from the difference $P_{load}$ between the load prediction data and the new regeneration energy generation prediction data in an identical time region.

14. The method of claim 10, wherein:

receiving the integrated schedule information, the characteristic information and the state information of the ESSs comprises further receiving, by the input unit, the load prediction data and the new regeneration energy generation prediction data; and generating schedule information comprises:

generating, by the scheduling unit, a curve data using the difference between the load prediction data and the new regeneration energy generation prediction data;

calculating, by the scheduling unit, a scheduled charging region in a lowest region $P_{load,Min}$; and generating, by the scheduling unit, a scheduled charging value $\Sigma(P_{Ck}, T_{Ck})$, including an amount of power to be charged and a charging time in the scheduled charging region, as charging schedule information.

15. The method of claim 14, wherein calculating a scheduled charging region comprises:

stopping, by the scheduling unit, a $P_C$ scan at a point at which a sum of values obtained by multiplying an amount of power to be charged and a charging time in an identical section becomes equal to a DOD capacity $W_{DOD}$ of the ESS; and calculating the scheduled charging region.

16. The method of claim 15, wherein calculating a scheduled charging region comprises calculating, by the scheduling unit, an amount of power $P_{Ck}$ to be charged and the charging time $T_{Ck}$ based on a value obtained by subtracting the difference $P_{load}$ between the load prediction data and the new regeneration energy generation prediction data in an identical time region from an amount of power $P_{C\_SCAN}$ in the scheduled charging region.

17. The method of claim 10, wherein calculating the matrix schedule information comprises arranging, by the scheduling unit, the ESSs based on the characteristic information and the state information.

18. The method of claim 10, wherein calculating the matrix schedule information comprises:

calculating, by the scheduling unit, the matrix charging schedule information by multiplying matrix ESS information, which forms the target scheduling regions, and matrix time information based on the time intervals; or calculating, by the scheduling unit, the matrix discharging schedule information by multiplying matrix ESS information, which forms the target discharge scheduling regions, and matrix discharge time information based on the time intervals.

* * * * *